(12) United States Patent
Yang et al.

(10) Patent No.: US 8,901,907 B2
(45) Date of Patent: Dec. 2, 2014

(54) CURRENT-LIMIT SYSTEM AND METHOD

(71) Applicant: Anpec Electronics Corporation, Hsin-Chu (TW)

(72) Inventors: Tse-Lung Yang, Yunlin County (TW); Hsiang-Chung Chang, Hsinchu (TW)

(73) Assignee: Anpec Electronics Corporation, Hsinchu Science Park, Hsin-Chu (TW)

( * ) Notice: Subject to any disclaimer, the term of this patent is extended or adjusted under 35 U.S.C. 154(b) by 150 days.

(21) Appl. No.: 13/732,430

(22) Filed: Jan. 1, 2013

(65) Prior Publication Data

US 2014/0097811 A1   Apr. 10, 2014

(30) Foreign Application Priority Data

Oct. 5, 2012   (TW) ............................... 101136933 A (51) Int. Cl.
*G05F 1/40* (2006.01)
*G05F 1/46* (2006.01)

(52) U.S. Cl.
CPC ...................................... *G05F 1/468* (2013.01)
USPC ......................................................... 323/282

(58) Field of Classification Search
USPC ............................ 323/274, 282–285; 327/563
See application file for complete search history.

(56) References Cited

U.S. PATENT DOCUMENTS

| | | | |
|---|---|---|---|
| 6,828,764 B2 * | 12/2004 | Takimoto et al. | 323/284 |
| 7,053,712 B2 | 5/2006 | Bonaccio | |
| 7,768,344 B2 * | 8/2010 | Kawamoto et al. | 327/563 |
| 8,319,487 B2 * | 11/2012 | Michishita et al. | 323/284 |
| 8,659,282 B2 * | 2/2014 | Chen | 323/285 |
| 2005/0017703 A1 * | 1/2005 | Walters et al. | 323/288 |
| 2009/0066305 A1 * | 3/2009 | Noda | 323/282 |
| 2009/0302820 A1 | 12/2009 | Shimizu | |
| 2011/0298431 A1 * | 12/2011 | Sander et al. | 323/271 |
| 2012/0194149 A1 * | 8/2012 | Noda | 323/274 |

FOREIGN PATENT DOCUMENTS

| | | |
|---|---|---|
| TW | 200744292 | 12/2007 |
| TW | 201136119 | 10/2011 |
| TW | 201230681 | 7/2012 |

\* cited by examiner

*Primary Examiner* — Adolf Berhane
(74) *Attorney, Agent, or Firm* — Winston Hsu; Scott Margo (57) ABSTRACT

A current-limit system for limiting an average current of an output signal of a DC-DC converter includes a current sensing device, coupled to the DC-DC converter, for detecting the average current of the output signal of the DC-DC converter; and a current-to-voltage converting module, coupled to the current sensing device, for converting the average current into a clamp voltage, in order to control the DC-DC converter according to the clamp voltage.

17 Claims, 9 Drawing Sheets

CURRENT-LIMIT SYSTEM AND METHOD

BACKGROUND OF THE INVENTION

1. Field of the Invention

The present invention relates to a current-limit system and method, and more particularly, to a current-limit system and method capable of limiting an average current of a DC-DC converter.

2. Description of the Prior Art

DC-DC converters have been widely utilized in power management devices for providing operating voltages with different levels. A well-controlled DC-DC converter can provide a stable output voltage and a wide range of output currents. A conventional DC-DC converter possesses sound protection devices, which not only protect the whole system, but also provide a self-protecting function, such as over-heat protection, current-limit protection, short circuit protection, low voltage lock-out, and high voltage lock-out.

Figure 1:
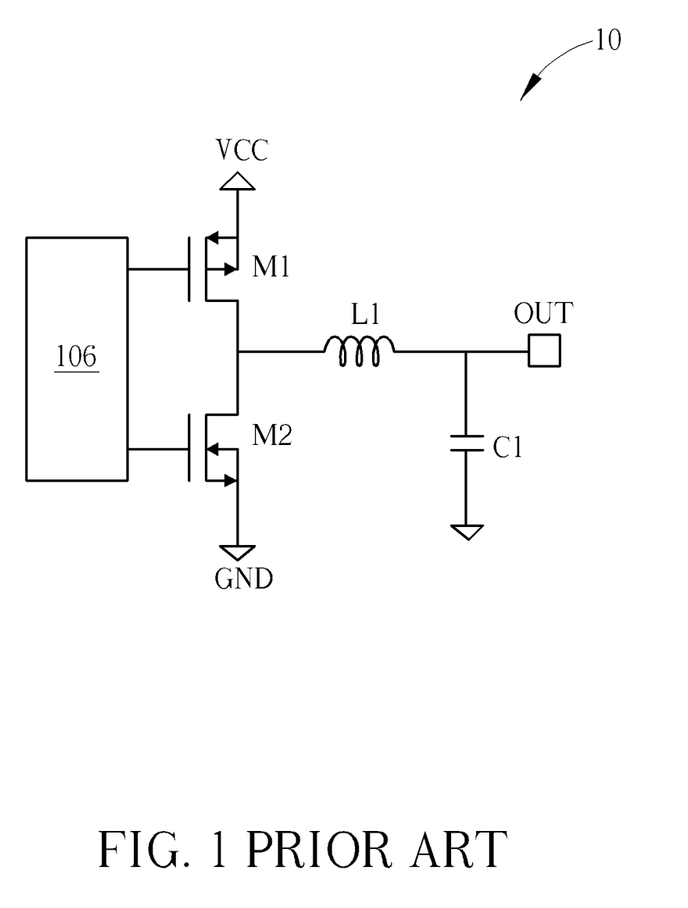
FIG. 1 is a schematic diagram of an output circuit of a conventional inductor type DC-DC converter.

Among these protection devices, the current-limit protecting device, which is capable of limiting an output current of a DC-DC converter when the output current is too large, is one of the most common protecting devices. An inductor type DC-DC converter is provided as an example. Please refer to FIG. 1, which is a schematic diagram of an output circuit 10 of a conventional inductor type DC-DC converter. As shown in FIG. 1, the output circuit 10 includes a driving circuit 106 and an inductor L1. The driving circuit 106 includes a high-side transistor M1 and a low-side transistor M2. The high-side transistor M1, coupled between a power input terminal VCC and the inductor L1, is utilized for supplying charging currents which flow via the inductor L1 to an output terminal OUT. The low-side transistor M2, coupled between a ground terminal GND and the inductor L1, is utilized for providing discharging currents which flow from the inductor L1 to the ground terminal GND. The output circuit 10 may further include a capacitor C1, which is utilized for stabilizing the output voltage.

Figure 2A:
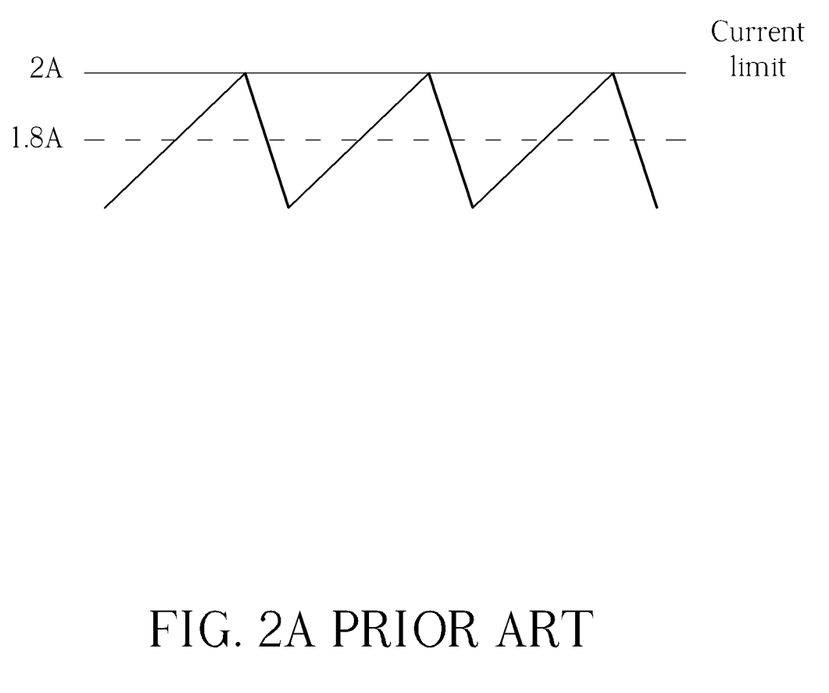
FIG. 2A and FIG. 2B are waveform diagrams of the output currents of the DC-DC converter.
Figure 2B:
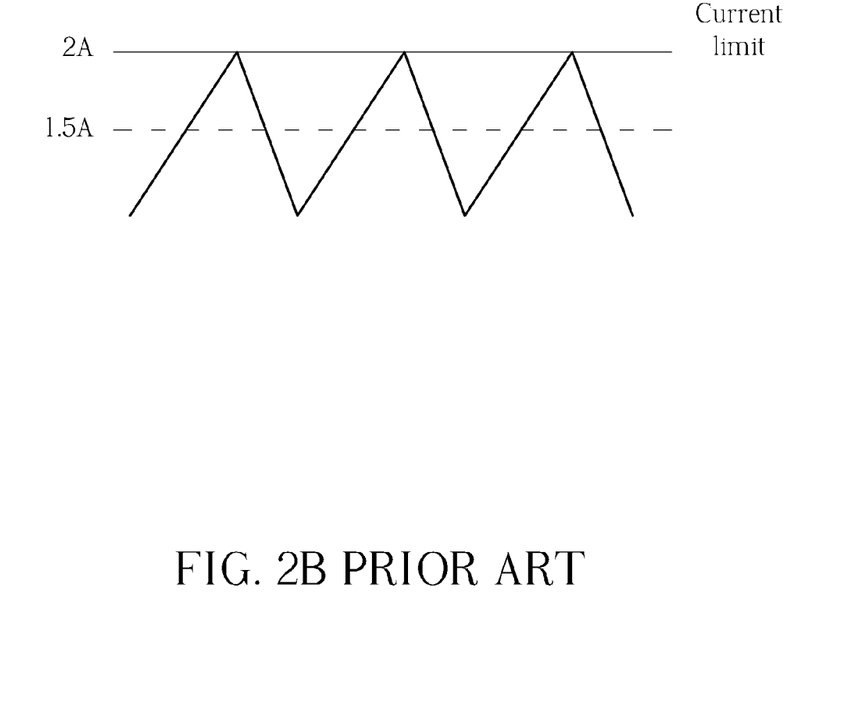

A conventional current-limit protecting method is performed by detecting the output current of the DC-DC converter or the current flowing through the inductor L1. When the detected current is greater than a predefined value, the system determines that the inductor type DC-DC converter is in an over-current status and enters a current-limit mode. At this moment, the system controls the high-side transistor M1 of the driving circuit 106 to be turned off, in order to prevent the charging current from flowing from the high-side transistor M1 via the inductor L1 to the output terminal OUT. When the current drops to the predefined value or another predefined value, the system determines that the over-current status is released; hence the inductor type DC-DC converter will recover to a normal operating mode. In general, the output current of the DC-DC converter will appear to be a ripple type, as shown in FIG. 2A and FIG. 2B. In FIG. 2A and FIG. 2B, the method of detecting the current is by detecting the peak value of the current. When the peak value of the current reaches the predefined value, the inductor type DC-DC converter will enter the current-limit mode.

The inductor type DC-DC converter experiences various interferences which generate noises. These noises may cause current ripples in the output circuit 10. When the current ripples become greater such that the peak value of the current reaches the predefined value, the current-limit mode may be triggered inaccurately. Therefore, a desirable current detecting method is one which detects an average output current of the DC-DC converter or an average current flowing through the inductor L1. Since the inductors utilized in the DC-DC converters may have different inductances and the output voltages may also be different, the output currents of the DC-DC converter may have different amplitudes. If the peak value is utilized for detecting the current, the corresponding average current may not be obtained accurately. For example, the amplitude of the current in FIG. 2A is smaller, and its peak value is 2 A and average value is 1.8 A; the amplitude of the current in FIG. 2B is greater, and its peak value is 2A and average value is 1.5 A. If the system utilizes a peak current of 2 A as an upper limit of current-limit protection, the system may not possess a current-limit protection with a fixed average current limit. There is therefore a need for providing a current-limit system where the average current is detected as a current limit, in order to prevent the current-limit mode from being triggered inaccurately when noises cause a greater current ripple.

SUMMARY OF THE INVENTION

It is an objective of the present invention to provide a current-limit system and method capable of limiting an average current of a DC-DC converter, such that the current-limit mode may not be triggered inaccurately when a greater current ripple occurs.

The present invention discloses a current-limit system for limiting an average current of an output signal of a DC-DC converter. The current-limit system comprises a current sensing device, coupled to the DC-DC converter, for detecting the average current of the output signal of the DC-DC converter; and a current-to-voltage converting module, coupled to the current sensing device, for converting the average current into a clamp voltage, in order to control the DC-DC converter according to the clamp voltage.

The present invention further discloses a current-limit method for a DC-DC converter. The current-limit method comprises detecting an average current of an output signal of the DC-DC converter; converting the average current into a clamp voltage; and controlling the DC-DC converter according to the clamp voltage.

These and other objectives of the present invention will no doubt become obvious to those of ordinary skill in the art after reading the following detailed description of the preferred embodiment that is illustrated in the various figures and drawings.

DETAILED DESCRIPTION

Figure 3:
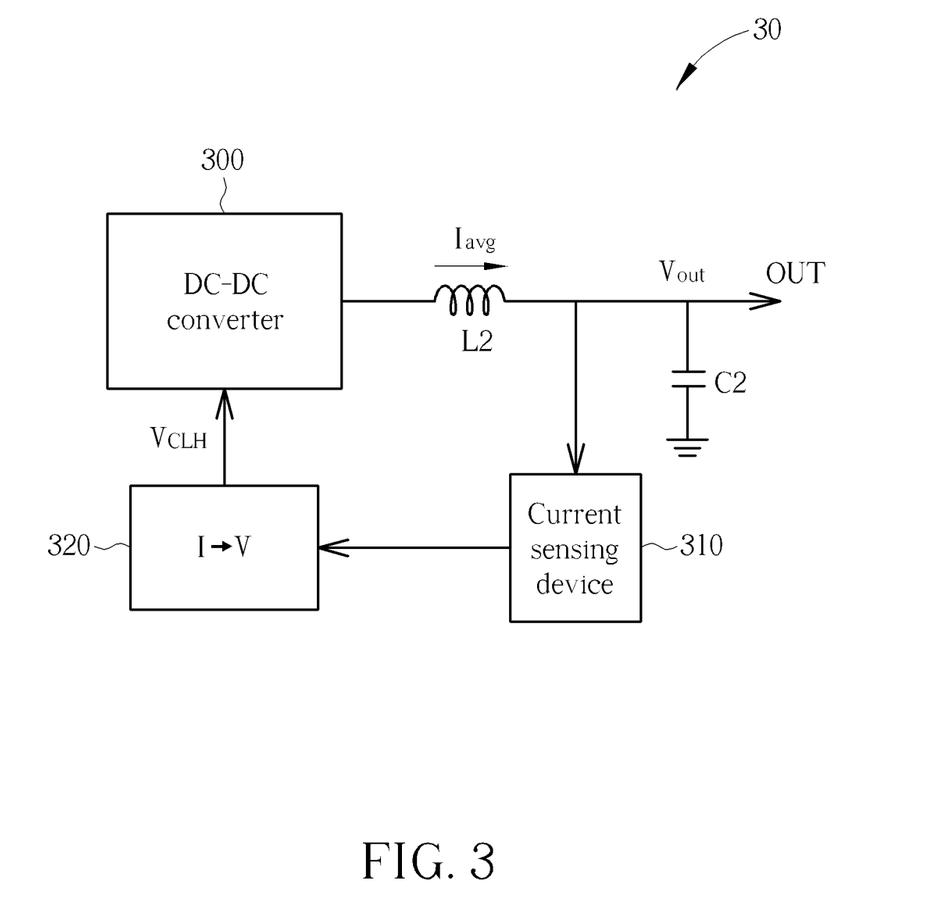
FIG. 3 is a schematic diagram of a current-limit system according to an embodiment of the present invention.

Please refer to FIG. 3, which is a schematic diagram of a current-limit system 30 according to an embodiment of the present invention. The current-limit system 30 is utilized for limiting an average current $I_{avg}$ of an output signal $V_{out}$ of a DC-DC converter 300. The current-limit system 30 includes a current sensing device 310 and a current-to-voltage converting module 320. In this embodiment, the DC-DC converter 300 is an inductor type DC-DC converter; hence an inductor L2 is connected in series between the DC-DC converter 300 and an output terminal OUT. A capacitor C2 is further coupled between the output terminal OUT and a ground terminal, for stabilizing the voltage of the output signal $V_{out}$. The current sensing device 310 is utilized for detecting the average current $I_{avg}$ of the output signal $V_{out}$ of the DC-DC converter 300. The current sensing device 310 can obtain the average current $I_{avg}$ by detecting the current flowing through the inductor L2. The current-to-voltage converting module 320, coupled to the current sensing device 310, is utilized for converting the average current $I_{avg}$ into a clamp voltage $V_{CLH}$, in order to control the operations of the DC-DC converter 300.

Figure 4:
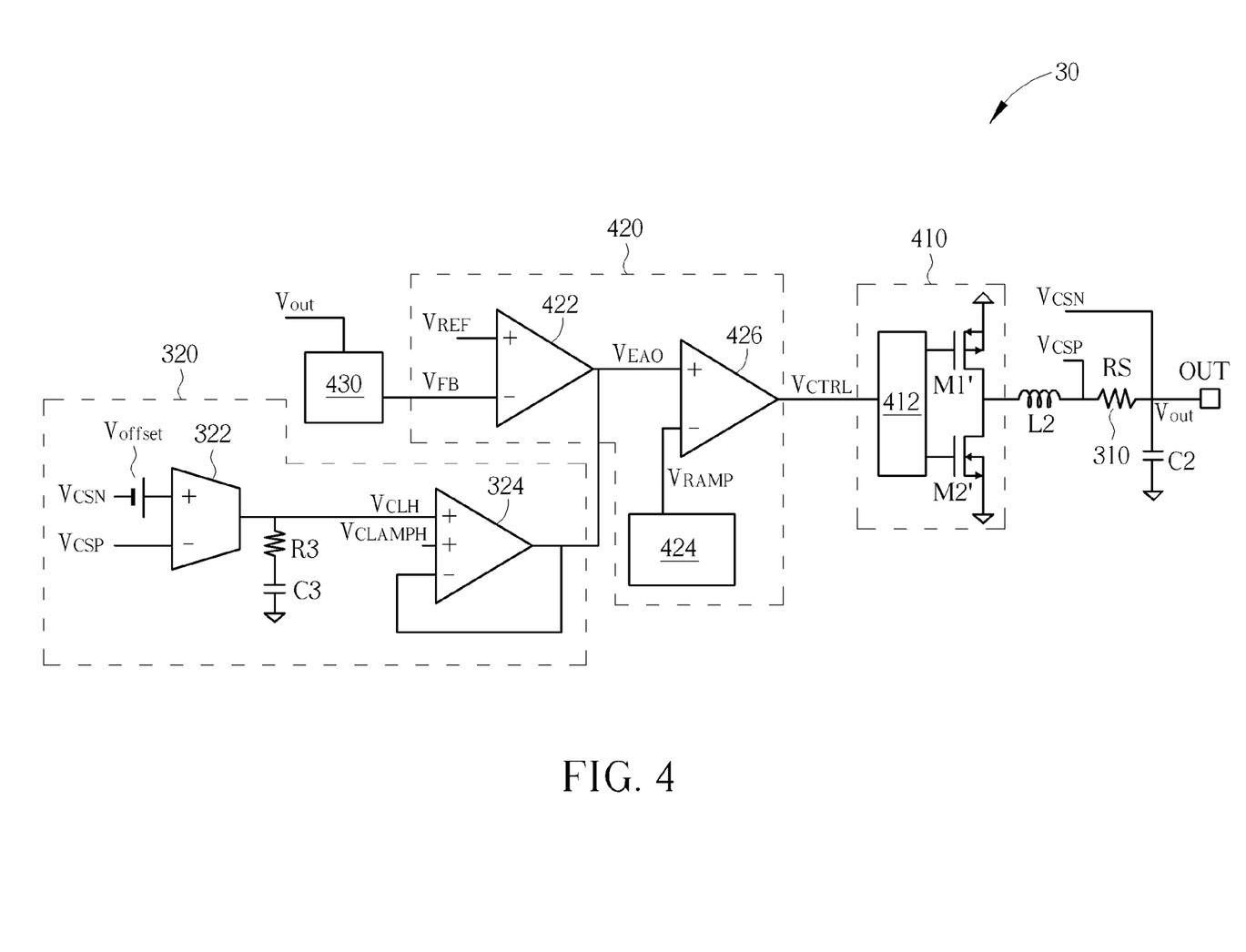
FIG. 4 illustrates the operations of the current-limit system in FIG. 3.

Please refer to FIG. 4, which further illustrates the operations of the current-limit system 30 in FIG. 3. As shown in FIG. 4, the DC-DC converter 300 includes a driving circuit 410, a control circuit 420, and a feedback circuit 430. The driving circuit 410 includes a high-side transistor M1', a low-side transistor M2', and a control stage module 412. The drain and source of the high-side transistor M1' are coupled to a power input terminal and the inductor L2, respectively, and the gate of the high-side transistor M1' is coupled to the control stage module 412. The drain and source of the low-side transistor M2' are coupled to the ground terminal and the inductor L2, respectively, and the gate of the low-side transistor M2' is coupled to the control stage module 412. The control stage module 412 is utilized for controlling the high-side transistor M1' and the low-side transistor M2' to be turned on or off according to a received control signal $V_{CTRL}$. The control circuit 420 includes an error amplifier 422, a ramp generator 424, and a comparator 426. The error amplifier 422 is utilized for generating an amplified signal $V_{EAO}$ according to a reference signal $V_{REF}$ and a feedback signal $V_{FB}$ from the feedback circuit 430. The ramp generator 424 is utilized for generating a ramp signal $V_{RAMP}$. The comparator 426, coupled to the error amplifier 422 and the ramp generator 424, is utilized for comparing the amplified signal $V_{EAO}$ and the ramp signal $V_{RAMP}$ to generate the control signal $V_{CTRL}$ to control the driving circuit 410. The feedback circuit 430 receives the output signal $V_{out}$ from the output terminal OUT, and generates the feedback signal $V_{FB}$ which is provided to the error amplifier 422 of the control circuit 420. The feedback circuit 430 may include resistors, for performing voltage division on the voltage of the output signal $V_{out}$ in order to generate the feedback signal $V_{FB}$.

Please keep referring to FIG. 4. The current sensing device 310 may be a resistor RS connected in series to the inductor L2, and the current-to-voltage converting module 320 converts a current flowing via the resistor RS to a voltage signal. The current-to-voltage converting module 320 includes a compensation voltage source $V_{offset}$, a comparator 322, a capacitor C3, a resistor R3, and a voltage follower 324. The current-to-voltage converting module 320 receives voltages $V_{CSN}$ and $V_{CSP}$ from two terminals of the resistor RS, and the compensation voltage source $V_{offset}$ and the comparator 322 are utilized for converting the difference between the voltages $V_{CSN}$ and $V_{CSP}$ into the clamp voltage $V_{CLH}$. The method of determining the upper limit of the average current can be implemented in the current sensing device 310 and the current-to-voltage converting module 320. For example, if the desired upper limit of the average current is 1 A, the compensation voltage source can be determined to be $V_{offset}$=100 mV, and thus the resistance of RS is RS=100 mV/1 A=0.1Ω. If the desired upper limit for the average current is raised to 2 A, the compensation voltage source is still $V_{offset}$=100 mV, and thus the resistance of RS can be modified as RS=100 mV/2 A=0.05Ω. Therefore, in this embodiment, if the resistor RS is replaced then the upper limit of the average current outputted by the DC-DC converter 300 can be adjusted. In other embodiments, the inductor L2 may be connected in series to a variable resistor. If the resistance of the variable resistor is adjusted then the upper limit of the average current outputted by the DC-DC converter 300 can be adjusted. In comparison with the conventional DC-DC converters, where the adjustments are always performed inside the chips when system requirements change and over-current settings need to be adjusted, the above embodiment can adjust the external resistor to modify the upper limit of the average current, such that the adjustment cost can be reduced significantly, and greater convenience can be achieved when the system has different over-current requirements. For example, when the same chip is applied together with different resistors with different resistance values, different over-current requirements can be met. In some embodiments, the voltage of the compensation voltage source $V_{offset}$ can also be adjusted, to adjust the upper limit of the average current of the DC-DC converter 300.

Please keep referring to FIG. 4. The capacitor C3 and the resistor R3 are utilized for stabilizing the clamp voltage $V_{CLH}$. The voltage follower 324 can utilize the clamp voltage $V_{CLH}$ for maintaining the voltage of the amplified signal $V_{EAO}$ when an over-current occurs. When the over-current does not occur, the voltage follower 324 further utilizes a bias signal $V_{CLAMPH}$ to control the amplified signal $V_{EAO}$. In some embodiments, the voltage follower 324 may also be implemented in the control circuit 420, which is not limited herein. In addition, the current sensing device 310 may also utilize a current mirror or other methods for detecting the average current $I_{avg}$, or utilize other methods for converting the current into a voltage signal. Alternatively, the current-to-voltage converting module 320 may not be utilized, and the current signal is directly utilized for controlling the operations of the DC-DC converter 300, which is not limited herein.

When the voltage difference $V_{CSP}$-$V_{CSN}$ is less than the compensation voltage $V_{offset}$, the over-current does not occur. At this moment, the clamp voltage $V_{CLH}$ is in a higher voltage level. The voltage follower 324 therefore utilizes the bias signal $V_{CLAMPH}$ for controlling the amplified signal $V_{EAO}$, where the bias signal $V_{CLAMPH}$ has a lower voltage in comparison with the clamp voltage $V_{CLH}$. When the voltage difference $V_{CSP}$-$V_{CSN}$ is greater than the compensation voltage $V_{offset}$, the over-current occurs. At this moment, the clamp voltage $V_{CLH}$ is in a lower voltage level. The voltage follower 324 therefore utilizes the clamp voltage $V_{CLH}$ for controlling the amplified signal $V_{EAO}$, wherein the clamp voltage $V_{CLH}$ has a lower voltage in comparison with the bias signal $V_{CLAMPH}$. As a result, since the clamp voltage $V_{CLH}$ is converted from the average current $I_{avg}$ of the output signal $V_{out}$ of the DC-DC converter 300, utilizing the clamp voltage $V_{CLH}$ for controlling the amplified signal $V_{EAO}$ is equal to controlling the amplified signal $V_{EAO}$ according to the average current $I_{avg}$, in order to control the operations of the DC-DC converter 300.

Figure 5:
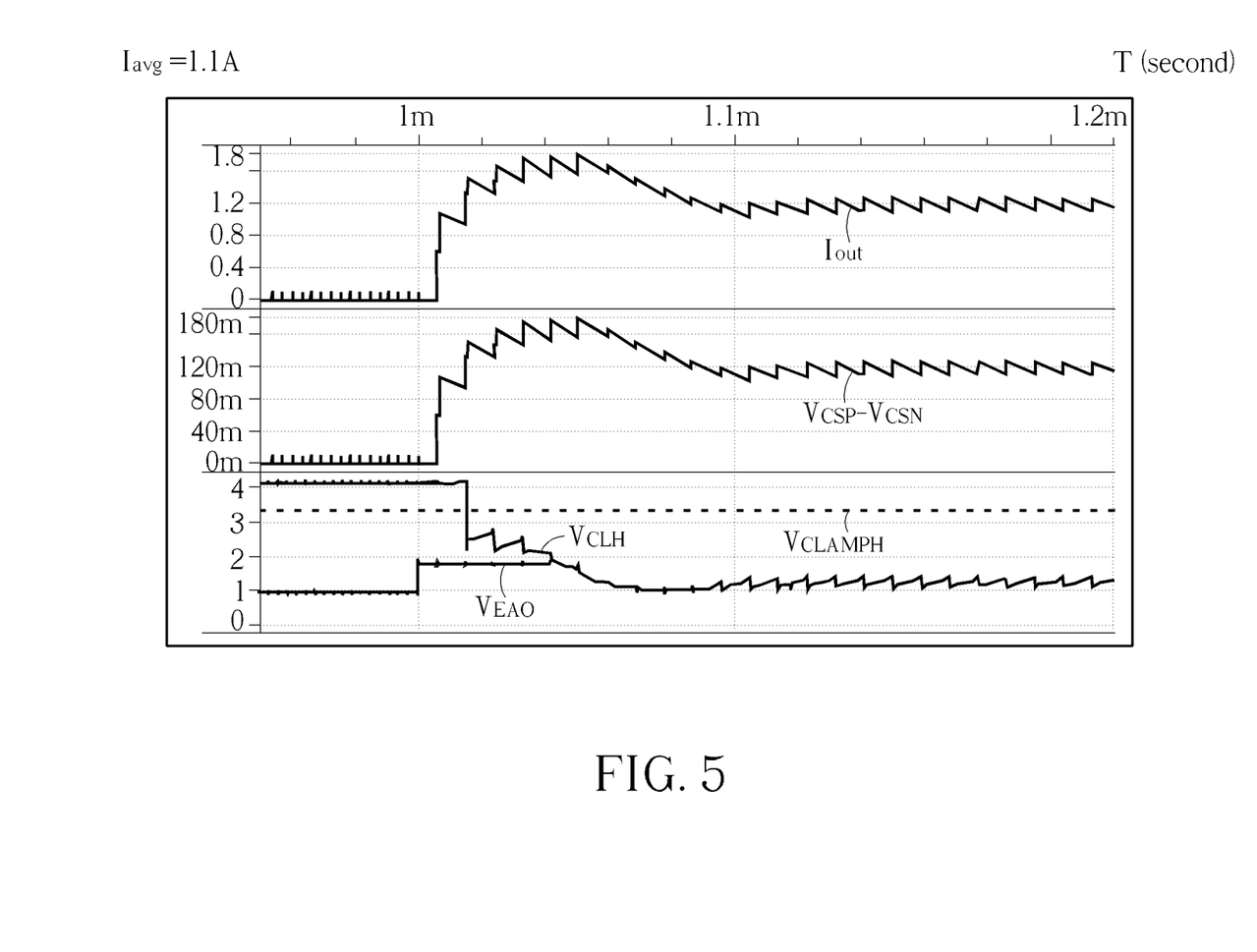
FIG. 5 is a waveform diagram where the average current of the current-limit system in FIG. 3 is limited to 1.1 A.

The operations of controlling the amplified signal $V_{EAO}$ by utilizing the voltage difference between $V_{CSP}$ and $V_{CSN}$ for generating the clamp voltage $V_{CLH}$ are illustrated in FIG. 5, which is a waveform diagram where the average current $I_{avg}$ of the current-limit system 30 in FIG. 3 is limited to 1.1 A. As shown in FIG. 5, after power is turned on for a while (T=1 ms~1.1 ms), the clamp voltage $V_{CLH}$ gradually falls to a voltage level lower than the bias signal $V_{CLAMPH}$, which means that the over-current occurs. At this moment, the clamp voltage $V_{CLH}$ controls the amplified signal $V_{EAO}$ via the voltage follower 324, such that the amplified signal $V_{EAO}$ varies in accordance with the clamp voltage $V_{CLH}$. The amplified signal $V_{EAO}$ then controls the DC-DC converter 300, such that the average current $I_{avg}$ outputted by the DC-DC converter 300 is stabilized close to 1.1 A. The voltage difference $V_{CSP}$-$V_{CSN}$ detected by the current sensing device 310 replicates the waveform of the output current $I_{out}$, and the waveform is converted into the clamp voltage $V_{CLH}$ by the current-to-voltage module 320 to control the amplified signal $V_{EAO}$, so as to build a feedback system. As a result, the operations of utilizing the average current $I_{avg}$ to control the DC-DC converter 300 can be realized. At this moment, the average current $I_{avg}$ is utilized as the upper limit of the current in the current-limit protecting system.

Figure 6:
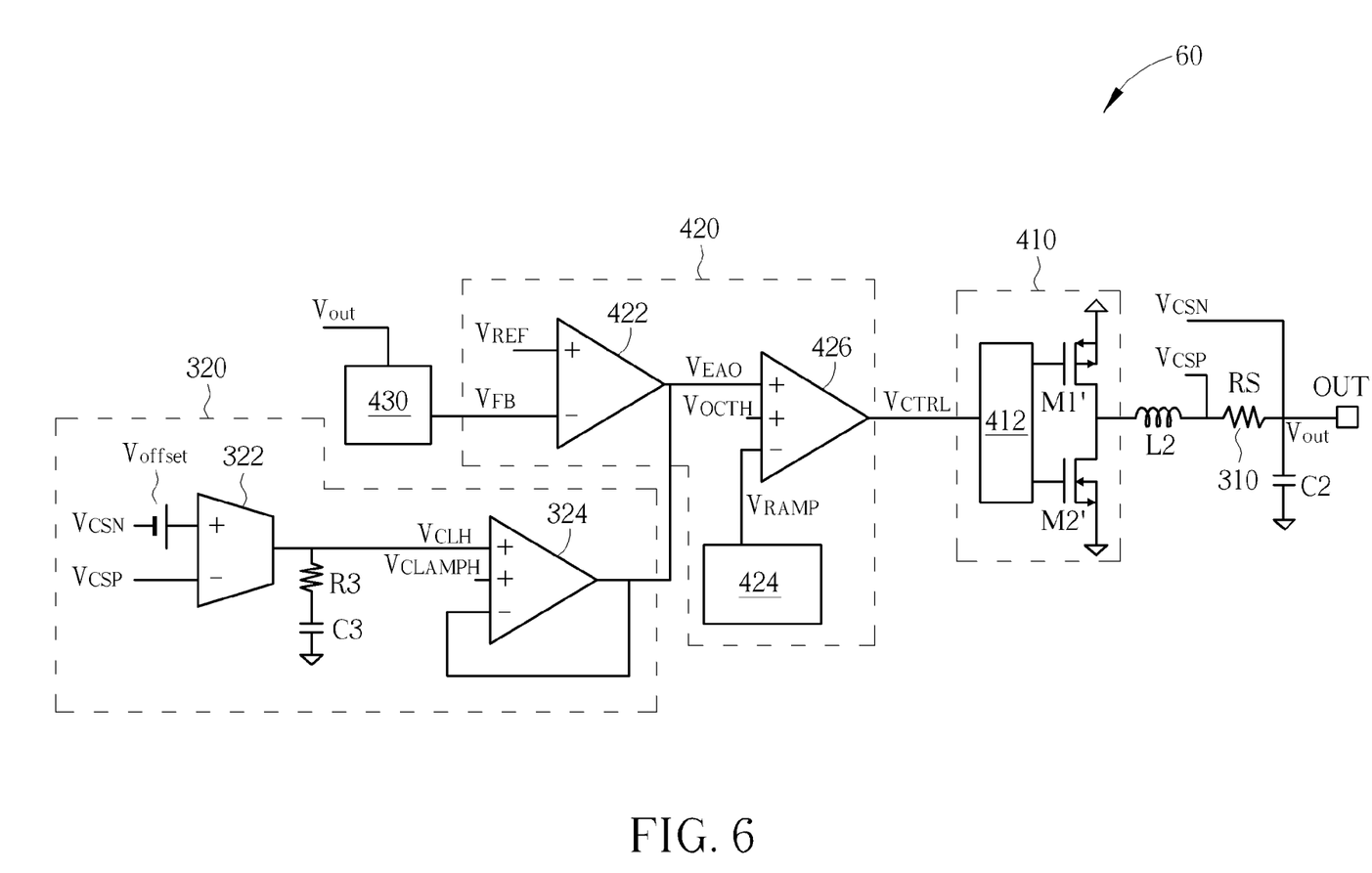
FIG. 6 is a schematic diagram of a current-limit system having functions of average current limit and maximum current limit simultaneously according to an embodiment of the present invention.

Please note that the spirit of the present invention is to control the operations of the DC-DC converter 300 according to the average current $I_{avg}$, and more particularly, to utilize the average current $I_{avg}$ as the upper limit of the current in the current-limit protecting system. Those skilled in the art can make modifications or alterations accordingly. For example, in the above embodiment, the current-limit method only utilizes the feedback system built by the current sensing device 310 and the current-to-voltage converting module 320 to control the upper limit of the average current $I_{avg}$. In some embodiments, the above current-limit system 30 may also be utilized together with the conventional current-limit system, in order to generate a current-limit system having functions of average current limit and maximum current limit simultaneously. Please refer to FIG. 6, which is a schematic diagram of a current-limit system 60 having functions of average current limit and maximum current limit simultaneously according to an embodiment of the present invention. As shown in FIG. 6, the current-limit system 60 is similar to the current-limit system 30 in FIG. 4, and thus the same elements are denoted by the same symbols. The difference between the current-limit system 60 and the current-limit system 30 is that the current-limit system 60 further includes an over-current signal $V_{OCTH}$. The over-current signal $V_{OCTH}$ can be utilized as an input signal of the comparator 426, and can replace the amplified signal $V_{EAO}$ for controlling the comparator 426 to output the control signal $V_{CTRL}$, which in turn controls the high-side transistor M1' in the driving circuit to stop charging the load when the over-current occurs, in order to reduce the output current. The over-current signal $V_{OCTH}$ is generated by another current sensing device (not illustrated in FIG. 6). The method of detecting over-current and generating the over-current signal $V_{OCTH}$ should be well known by those skilled in the art, and will not be narrated herein.

Figure 7:
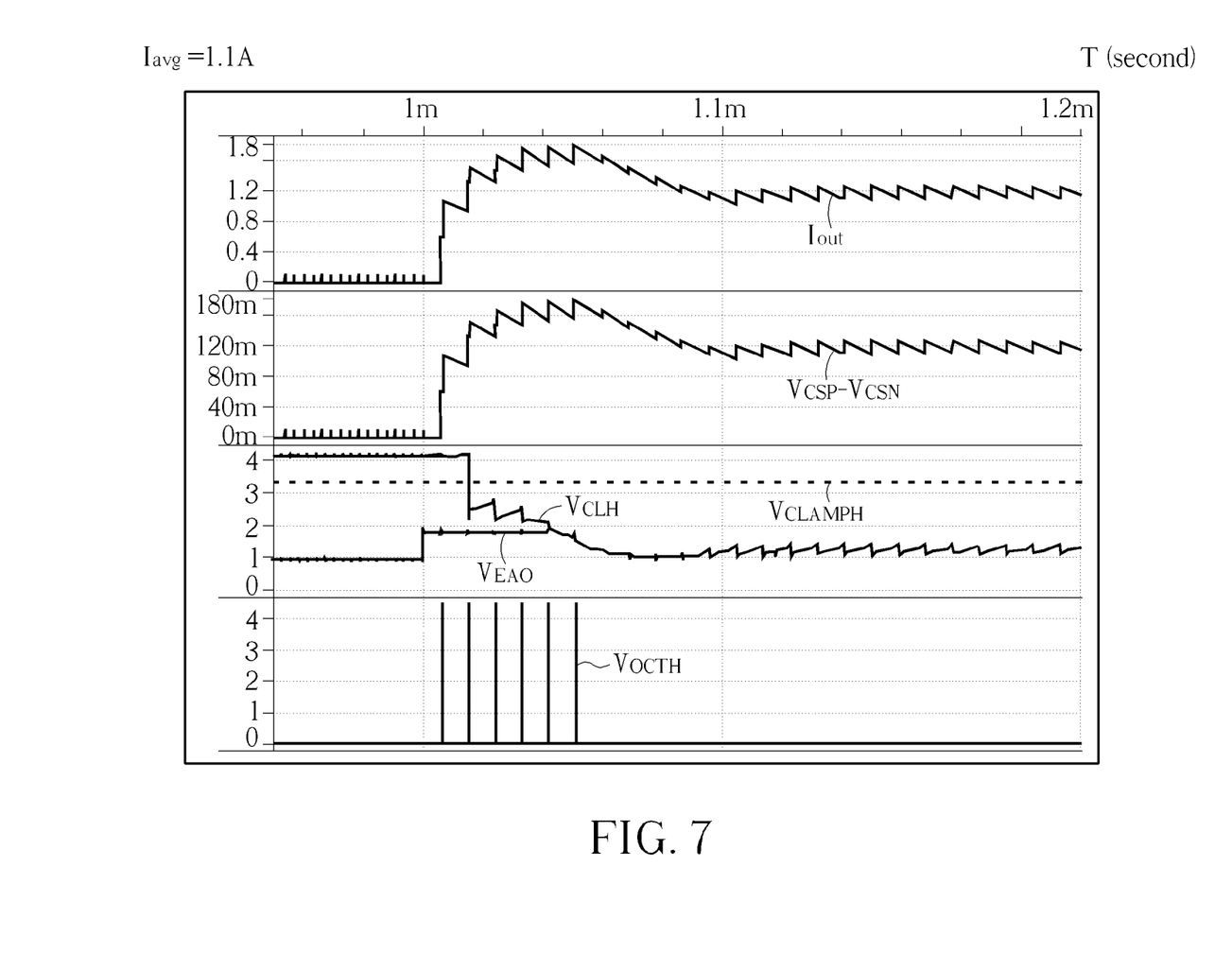
FIG. 7 is a waveform diagram where the average current of the current-limit system in FIG. 6 is limited to 1.1 A.

The detailed operations of the current-limit system 60 are illustrated in FIG. 7, which is a waveform diagram where the average current $I_{avg}$ of the current-limit system 60 in FIG. 6 is limited to 1.1 A. The waveforms in FIG. 7 are the waveforms in FIG. 5 in addition to the waveform of the over-current signal $V_{OCTH}$. At the moment of the power of the DC-DC converter 300 being turned on, since the internal circuit is not stable yet, an extremely large current may be generated. Since the capacitor C3 and the resistor R3 utilized in the current-to-voltage converting module 320 should have greater values for stabilizing the clamp voltage $V_{CLH}$, the clamp voltage $V_{CLH}$ may not reach the accurate level rapidly. Therefore, the current-to-voltage converting module 320 can operate normally only after a certain period of time. Before the current-to-voltage converting module 320 enters the normal operating mode, the over-current signal $V_{OCTH}$ may start operating first. As shown in FIG. 7, when the power of the DC-DC converter 300 is turned on (T=1 ms), the output current $I_{out}$ may rise rapidly. When the output current $I_{out}$ rises to a pre-defined value, the over-current signal $V_{OCTH}$ is activated, such that the high-side transistor M1' in the driving circuit 410 stops charging the load to reduce the current. When the output current $I_{out}$ is lower than the predefined value or another predefined current value, the over-current signal $V_{OCTH}$ is turned off, and the high-side transistor M1' is turned on again such that the output current $I_{out}$ rises. When the output current $I_{out}$ rises to the predefined value, the high-side transistor M1' is turned off again to reduce the current. At this moment, the maximum value of the output current $I_{out}$ can be limited to the predefined current. As a result, after several cycles, the current-to-voltage converting module 320 starts to operate normally (T=1.05 ms), and the clamp voltage $V_{CLH}$ falls to a lower voltage level and drives the amplified signal $V_{EAO}$ to fall together, such that the average current $I_{avg}$ outputted by the DC-DC converter 300 is stabilized close to 1.1 A (T=1.1 ms). In general, the predefined current for activating the over-current signal $V_{OCTH}$ may be defined to be greater than the upper limit of the average current $I_{avg}$ with a margin, such that the DC-DC converter 300 can utilize the maximum value of the average current $I_{avg}$ as its upper limit of the current after the current-limit system 60 is stabilized.

Figure 8:
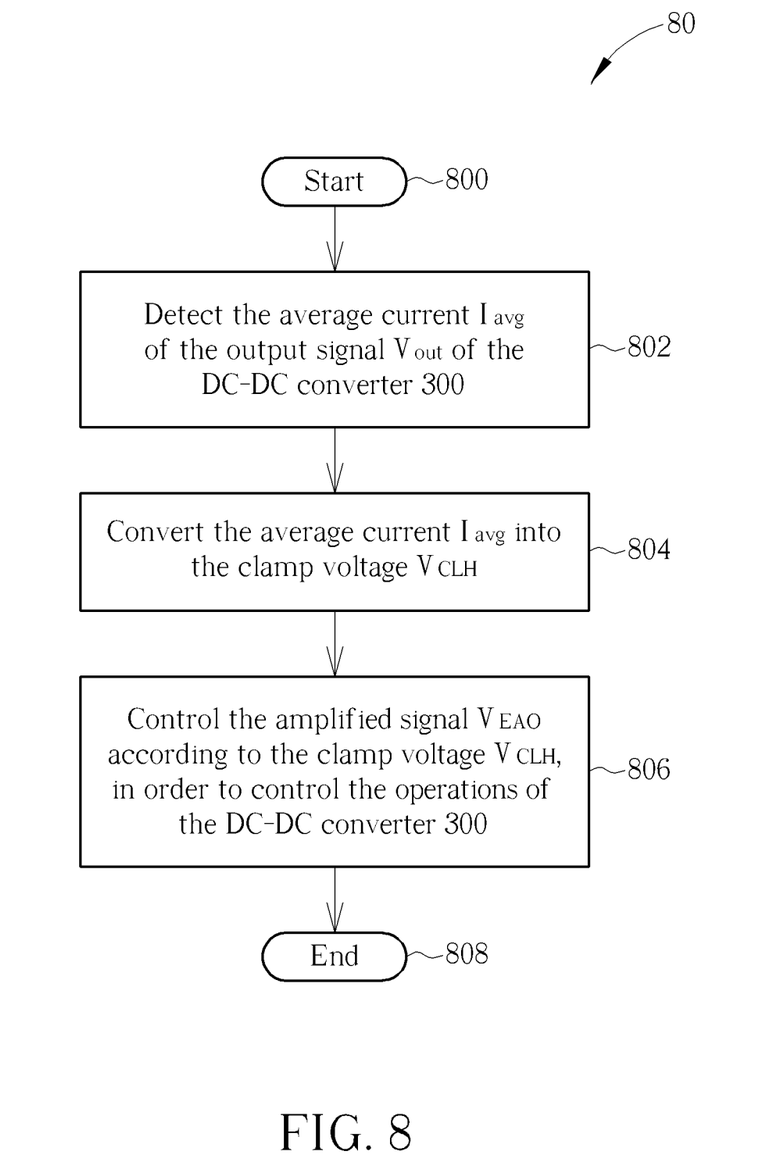
FIG. 8 is a schematic diagram of a current-limit process according to an embodiment of the present invention.

The above operations of the current-limit system 30, 60 can be summarized into a current limiting process 80. As shown in FIG. 8, the current limiting process 80 includes the following steps:

Step 800: Start.

Step 802: Detect the average current $I_{avg}$ of the output signal $V_{out}$ of the DC-DC converter 300.

Step 804: Convert the average current $I_{avg}$ into the clamp voltage $V_{CLH}$.

Step 806: Control the amplified signal $V_{EAO}$ according to the clamp voltage $V_{CLH}$, in order to control the operations of the DC-DC converter 300.

Step 808: End.

The detailed operations of the current limiting process 80 are illustrated above, and will not be narrated herein.

In the prior art, the peak value of current is utilized as the upper limit of current of the current-limit protecting system. When the current ripples become greater such that the peak value of the current achieves the upper limit value, the current-limit mode may be triggered inaccurately. In comparison, the present invention can control the operations of the DC-DC converter 300 according to the average current $I_{avg}$, and utilize the average current $I_{avg}$ as the upper limit of current of the current-limit protecting system, in order to prevent the current-limit mode from being triggered inaccurately when noises cause greater current ripples. When the over-current requirements vary, the present invention can modify the upper limit of the average current by adjusting the external resistor, such that the adjustment cost can be reduced significantly, and greater convenience can be achieved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A current-limit system for limiting an average current of an output signal of a DC-DC converter, the current-limit system comprising:

a current sensing device, coupled to the DC-DC converter, for detecting the average current of the output signal of the DC-DC converter; and a current-to-voltage converting module, coupled to the current sensing device, for converting the average current into a clamp voltage, in order to control the DC-DC converter according to the clamp voltage;

wherein the current sensing device comprises a first resistor, for detecting the average current of the output signal, and the current-to-voltage converting module comprises:

a first compensation voltage source, coupled to the first resistor, for compensating voltages of two terminals of the first resistor; and a first comparator, coupled to the first resistor and the first compensation voltage source, for comparing a voltage difference between the two terminals of the first resistor and a voltage of the first compensation voltage source to output the clamp voltage.

2. The current-limit system of claim 1, wherein the DC-DC converter comprises:

a driving circuit, for generating the output signal;

a control circuit, coupled to the driving circuit, for generating a control signal to control the driving circuit according to a feedback signal and the clamp voltage; and a feedback circuit, coupled to the control circuit, for generating the feedback signal for the control circuit according to the output signal.

3. The current-limit system of claim 2, wherein the driving circuit comprises:

a first transistor, comprising a first terminal coupled to a power input terminal, a second terminal for outputting the output signal, and a control terminal;

a second transistor, comprising a first terminal coupled to a ground terminal, a second terminal for outputting the output signal, and a control terminal; and a control stage module, coupled to the control terminal of the first transistor and the control terminal of the second transistor, for controlling the first transistor and the second transistor to be turned on or off.

4. The current-limit system of claim 2, wherein the feedback circuit comprises a plurality of second resistors, for performing voltage division on the output signal in order to generate the feedback signal.

5. The current-limit system of claim 2, wherein the control circuit comprises:

an error amplifier, coupled to the feedback circuit, for generating an amplified signal according to the feedback signal and a reference voltage;

a ramp generator, for generating a ramp signal; and a second comparator, coupled to the error amplifier and the ramp generator, for comparing the amplified signal and the ramp signal to generate the control signal.

6. The current-limit system of claim 5, wherein the clamp voltage is utilized for limiting a maximum voltage of the amplified signal.

7. The current-limit system of claim 6, wherein the current-to-voltage converting module comprises a voltage follower, for maintaining the maximum voltage of the amplified signal as the clamp voltage.

8. The current-limit system of claim 1, wherein the first resistor is a variable resistor.

9. The current-limit system of claim 1, further comprising an inductor, coupled to an output terminal of the DC-DC converter.

10. The current-limit system of claim 9, wherein the current sensing device comprises a third resistor, for detecting an average current flowing through the inductor.

11. The current-limit system of claim 10, wherein the current-to-voltage converting module comprises:

a second compensation voltage source, coupled to the third resistor, for compensating voltages of two terminals of the third resistor; and a third comparator, coupled to the third resistor and the second compensation voltage source, for comparing a voltage difference between the two terminals of the third resistor and a voltage of the second compensation voltage source to output the clamp voltage.

12. The current-limit system of claim 10, wherein the third resistor is a variable resistor.

13. A current-limit method for a DC-DC converter, comprising:

detecting an average current of an output signal of the DC-DC converter;

converting the average current into a clamp voltage; and controlling the DC-DC converter according to the clamp voltage;

wherein the step of detecting the average current of the output signal of the DC-DC converter comprises detecting the average current of the output signal of the DC-DC converter by utilizing a resistor, and the step of converting the average current into a clamp voltage comprises:

utilizing a compensation voltage for compensating the voltage difference between two terminals of the resistor; and comparing the voltage difference between the two terminals of the resistor and the compensation voltage to output the clamp voltage.

14. The current-limit method of claim 13, wherein the step of detecting the average current of the output signal of the DC-DC converter by utilizing the resistor comprises detecting voltages of two terminals of the resistor and utilizing a resistance value of the resistor and a voltage difference between the two terminals of the resistor for calculating the average current of the output signal of the DC-DC converter.

15. The current-limit method of claim 13, wherein the resistor is a variable resistor.

16. The current-limit method of claim 13, further comprising an inductor, coupled to an output terminal of the DC-DC converter.

17. The current-limit method of claim 16, wherein the step of detecting the average current of the output signal of the DC-DC converter comprises detecting an average current flowing through the inductor.

* * * * *